(12) United States Patent
Deng et al.

(10) Patent No.: US 11,355,975 B2
(45) Date of Patent: Jun. 7, 2022

(54) STATOR FOR MOTOR AND METHOD OF MANUFACTURING

(71) Applicant: FORD GLOBAL TECHNOLOGIES, LLC, Dearborn, MI (US)

(72) Inventors: Chuan Deng, Jiangsu (CN); Yigang Yuan, Jiangsu (CN); Guohua Du, Jiangsu (CN); Xusheng Zhang, Jiangsu (CN); Joy Gong, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 183 days.

(21) Appl. No.: 16/739,558

(22) Filed: Jan. 10, 2020

(65) Prior Publication Data

US 2020/0244113 A1    Jul. 30, 2020

(30) Foreign Application Priority Data

Jan. 24, 2019   (CN) .......................... 201910070054.8

(51) Int. Cl.
*H02K 1/16*    (2006.01)
*H02K 15/02*   (2006.01)
*H02K 1/18*    (2006.01)

(52) U.S. Cl.
CPC ........... *H02K 1/165* (2013.01); *H02K 15/024* (2013.01)

(58) Field of Classification Search
CPC .......... H02K 1/148; H02K 1/16; H02K 1/165; H02K 15/02; H02K 15/024
See application file for complete search history.

(56) References Cited

U.S. PATENT DOCUMENTS

| 6,960,861 B2 * | 11/2005 | Yoneda | H02K 1/148 310/216.012 |
| 7,019,433 B2 * | 3/2006 | Hashimoto | H02K 1/148 310/402 |

(Continued)

FOREIGN PATENT DOCUMENTS

| CN | 101232206 A | 7/2008 |
| CN | 103051116 A | 4/2013 |

(Continued)

OTHER PUBLICATIONS

Hirzel, Andrew. Understanding the basics of amorphous-iron motors. Machine Design. Apr. 24, 2014. 17 pages.

*Primary Examiner* — Burton S Mullins
(74) *Attorney, Agent, or Firm* — Brooks Kushman PC; David Kelley

(57) ABSTRACT

A stator for a motor includes laminations arranged axially adjacently. A first lamination includes sub-yoke parts and tooth parts. The sub-yoke parts are spliced through a first yoke engaging part to form an annular first yoke part. The first tooth parts are assembled on an inner edge of the first yoke part through a first tooth engaging part. The second lamination includes sub-yoke parts and tooth parts. The sub-yoke parts are spliced through a second yoke engaging part to form an annular second yoke part. The second tooth parts are assembled on an inner edge of the second yoke part through a second tooth engaging part. The first and second tooth engaging parts are superposed in the axial direction. A method of manufacturing a stator for a motor is also described.

13 Claims, 12 Drawing Sheets

(56) References Cited

U.S. PATENT DOCUMENTS

| | | | |
|---|---|---|---|
| 7,960,889 B2 * | 6/2011 | Yamamoto | H02K 1/148 |
| | | | 310/216.004 |
| 11,245,294 B2 * | 2/2022 | Sumi | H02K 1/187 |
| 2009/0195112 A1 * | 8/2009 | Chai | H02K 1/148 |
| | | | 310/216.086 |
| 2017/0077767 A1 | 3/2017 | Kobayashi | |
| 2018/0175706 A1 | 6/2018 | Lin et al. | |
| 2018/0351417 A1 * | 12/2018 | Tsuiki | H02K 3/18 |
| 2021/0242742 A1 * | 8/2021 | Liao | H02K 1/165 |

FOREIGN PATENT DOCUMENTS

| | | | |
|---|---|---|---|
| CN | 109120080 | * | 1/2019 |
| DE | 102007024822 B3 | | 1/2009 |
| EP | 3229344 | * | 10/2017 |
| JP | 07067272 | * | 3/1995 |
| JP | H10271716 A | | 10/1998 |
| WO | WO 0072426 | * | 11/2000 |
| WO | WO 2007141907 | * | 12/2007 |
| WO | 2016088264 A1 | | 6/2016 |

* cited by examiner

STATOR FOR MOTOR AND METHOD OF MANUFACTURING

CROSS-REFERENCE TO RELATED APPLICATIONS

This application claims foreign priority benefits under 35 U.S.C. § 119(a)-(d) to CN Application 2019 100 700 54.8 filed Jan. 24, 2019, which is hereby incorporated by reference in its entirety.

TECHNICAL FIELD

The present application relates to the field of electric machines including stators for electric machines and methods of manufacturing a spliced stator.

BACKGROUND

Electric machines may be operable as motors and/or generators. Electric machines operating as drive motors provide torque to drive wheels for all-electric vehicles and hybrid electric vehicles. A motor usually includes a stator and a rotor. A stator includes a stator core formed by stacked silicon steel sheets as well as windings placed in stator slots that can generate a magnetic field when powered. A rotor includes a rotor core and a permanent magnet. The magnetic field generated by the stator windings can act with the rotor magnetic field generated by the permanent magnet to generate torque to achieve electromechanical energy conversion.

In a conventional electric machine manufacturing method, when a silicon steel sheet is stamped to form a stator, the material within the inner diameter cannot be used for other purposes and is wasted due to the blanking requirement of fixed inner and outer diameters of the stator.

SUMMARY

To solve at least one of the above problems, embodiments according to the present application may include a motor stator with reduced manufacturing cost and improved splicing stability.

According to one aspect of the present application, a stator for a motor comprises a first lamination and a second lamination arranged adjacently in the axial direction. The first lamination comprises a plurality of first sub-yoke parts and a plurality of first tooth parts. The plurality of first sub-yoke parts are spliced through a first yoke engaging part to form a substantially annular first yoke part, and the plurality of first tooth parts are assembled on an inner edge of the first yoke part through a first tooth engaging part. The second lamination comprises a plurality of second sub-yoke parts and a plurality of second tooth parts, the plurality of second sub-yoke parts are spliced through a second yoke engaging part to form a substantially annular second yoke part, and the plurality of second tooth parts are assembled on an inner edge of the second yoke part through a second tooth engaging part. The first tooth engaging part and the second tooth engaging part are superposed in the axial direction, the first tooth engaging part being different from the second tooth engaging part.

In some embodiments, the first sub-yoke part and the second sub-yoke part are formed by stamping the same silicon steel sheet and are substantially arc-shaped; a first tangential direction at an apex of the arc of the first sub-yoke part is consistent with a rolling direction of the silicon steel sheet, and a second tangential direction at an apex of the arc of the second sub-yoke part is consistent with the rolling direction of the silicon steel sheet.

In some embodiments, the first tooth part has a first lengthwise direction substantially parallel to a radial direction of the stator, the second tooth part has a second lengthwise direction substantially parallel to the radial direction of the stator, the first tooth part and the second tooth part are formed by stamping the same silicon steel sheet, and the first lengthwise direction of the first tooth part and the second lengthwise direction of the second tooth part are consistent with a rolling direction of the silicon steel sheet, i.e. match the rolling direction or are aligned with the rolling direction of the silicon steel sheet.

In some embodiments, the first tooth part has a first lengthwise direction substantially parallel to a radial direction of the stator, and the second tooth part has a second lengthwise direction substantially parallel to the radial direction of the stator; the first sub-yoke part and the second sub-yoke part are substantially arc-shaped; the first tooth part, the second tooth part, the first sub-yoke part, and the second sub-yoke part are formed by stamping the same silicon steel sheet; a first tangential direction at an apex of the arc of the first sub-yoke part and a second tangential direction at an apex of the arc of the second sub-yoke part are both consistent with a rolling direction of the silicon steel sheet, and the first lengthwise direction of the first tooth part and the second lengthwise direction of the second tooth part are both consistent with the rolling direction of the silicon steel sheet.

In some embodiments, the first sub-yoke part comprises a first opening located on an inner edge thereof, the first tooth part comprises a first protrusion located at an end part thereof, the first opening and the first protrusion constitute the first tooth engaging part, and the first protrusion is received in the first opening.

In some embodiments, the first opening is defined by two L-shaped first legs that extend radially from the inner edge of the first sub-yoke part and are spaced apart, the two first legs having first protruding parts that extend toward each other, and the two first legs being mirror-symmetrical to form a first groove. The first protrusion of the first tooth part is located at the end part of the first tooth part facing the first sub-yoke part, and comprises two first grooves respectively located on two side edges of the first tooth part in a lengthwise direction and first tooth protruding part located above the first grooves, the first tooth protruding parts being received in the first opening of the first sub-yoke part, and the first protruding parts of the first sub-yoke part being received in the first grooves.

In some embodiments, the second tooth part comprises a second opening located at an end part thereof, the second sub-yoke part comprises a second protrusion located on an inner edge thereof, the second protrusion of the second sub-yoke part and the second opening of the second tooth part constitute the second tooth engaging part, and the second protrusion is received in the second opening.

In some embodiments, the second opening of the second tooth part is defined by two C-shaped second legs that extend radially from the end part of the second tooth part and are spaced apart, the second legs each having a second protruding part, and the two first legs being mirror-symmetrical to form a second groove; the second protrusion of the second sub-yoke part comprising two second sub-yoke protruding parts, the two second sub-yoke protruding parts being spaced apart from the inner edge of the second sub-yoke part to form two second grooves, the second sub-yoke protruding parts being receivable in the second opening of the second tooth part, and the second protruding parts of the second tooth part being receivable in the second grooves of the second sub-yoke part.

In some embodiments, the first sub-yoke part comprises two first notches recessed from an inner edge thereof, the first tooth part comprises two first lugs protruding from an end part thereof, the two first notches and the two first lugs constitute the first tooth engaging part, and the two first lugs of the first tooth part are respectively received in the two first notches of the first sub-yoke part.

In some embodiments, the second sub-yoke part comprises two second lugs protruding from an inner edge thereof, the second tooth part comprises two second notches recessed from an end part thereof, the two second lugs of the second sub-yoke part and the two second notches of the second tooth part constitute the second tooth engaging part, and the two second lugs of the second sub-yoke part are respectively received in the two second notches of the second tooth part.

In some embodiments, the quantity of the first sub-yoke parts is the same as the quantity of the first tooth parts, one first tooth part being spliced to an inner edge of one first sub-yoke part; and the quantity of the second sub-yoke parts is the same as the quantity of the second tooth parts, one second tooth part being spliced to an inner edge of one second sub-yoke part.

In some embodiments, the quantity of the first sub-yoke parts is less than the quantity of the first tooth parts, a plurality of first tooth parts being spliced to an inner edge of one first sub-yoke part; and the quantity of the second sub-yoke parts is less than the quantity of the second tooth parts, a plurality of second tooth parts being spliced to an inner edge of one second sub-yoke parts.

In some embodiments, the stator comprises a plurality of first laminations and a plurality of second laminations, and the first laminations and the second laminations are arranged alternately in the axial direction.

In some embodiments, the first yoke engaging part is different from the second yoke engaging part.

According to another aspect of the present application, a stator for a motor is provided, and the stator comprises a first lamination and a second lamination arranged adjacent to the first lamination in the axial direction. The first lamination comprises a plurality of first sub-yoke parts and a plurality of first tooth parts, and the plurality of first sub-yoke parts are spliced through a first yoke engaging part to form a substantially annular first yoke part, wherein the first sub-yoke part comprises a first yoke opening located on an inner edge thereof, the first tooth part comprises a first tooth protrusion located at an end part thereof, and the first tooth protrusion is received in the first yoke opening. The second lamination comprises a plurality of second sub-yoke parts and a plurality of second tooth parts, and the plurality of second sub-yoke parts are spliced through a second yoke engaging part to form a substantially annular second yoke part, wherein the second sub-yoke part comprises a second yoke protrusion located on an inner edge thereof, the second tooth part comprises a second tooth opening located at an end part thereof, and the second yoke protrusion is received in the second tooth opening. The first tooth protrusion and the second sub-yoke protrusion are at least partially overlapped in the axial direction.

In some embodiments, the first yoke opening and the first tooth protrusion are configured to be interference-fitted, and the second yoke protrusion and the second tooth opening are configured to be interference-fitted.

In some embodiments, the first sub-yoke opening is defined by two first legs that extend radially from the inner edge of the first sub-yoke part and are spaced apart, the first legs each having an L-shaped first protruding part extending toward the first tooth part, the two first legs being mirror-symmetrical and forming a first groove together with a part of the inner edge of the first sub-yoke part, two side surfaces of the first tooth part each having a recess to form the first tooth protrusion, and the first tooth protrusion being received in the first groove of the first sub-yoke part. The second tooth opening is defined by two second legs that extend radially from the end part of the second tooth part and are spaced apart, the second legs extending from the end part of the second tooth part toward a second side surface and are approximately C-shaped, the two second legs being mirror-symmetrical to form a second groove together with the end part of the tooth part, and the second yoke protrusion being received in the second groove of the second tooth part.

In some embodiments, the first yoke opening comprises two first notches recessed from the inner edge of the first sub-yoke part, the first tooth protrusion comprises two first lugs protruding from the end part, and the two first lugs of the first tooth part are respectively received in the two first notches of the first sub-yoke part. The second yoke protrusion comprises two second lugs located and protruding from the inner edge of the second sub-yoke part, the second tooth opening comprises two second notches recessed from the end part, and the two second lugs of the second sub-yoke part are received in the two second notches of the second tooth part.

According to another aspect of the present application, a method of manufacturing a stator for a motor comprises: rolling a silicon steel block in a rolling direction to form a silicon steel sheet; stamping the silicon steel sheet to form a plurality of first sub-yoke parts, a plurality of second sub-yoke parts, a plurality of first tooth parts, and a plurality of second tooth parts, the first sub-yoke parts and the second sub-yoke parts being substantially arc-shaped, the first tooth parts and the second tooth parts being substantially rectangular, wherein a tangential direction at an apex of the arc of the first sub-yoke part is parallel to the rolling direction, a tangential direction at an apex of the arc of the second sub-yoke part is parallel to the rolling direction, a lengthwise direction of the first tooth part is parallel to the rolling direction, and a lengthwise direction of the second tooth part is parallel to the rolling direction; splicing the plurality of first sub-yoke parts through a first yoke engaging part to form a substantially annular first yoke part, and splicing the plurality of first tooth parts on an inner edge of the first yoke part through a first tooth engaging part to form a first lamination; splicing the plurality of second sub-yoke parts through a second yoke engaging part to form a substantially annular second yoke part, and splicing the plurality of second tooth parts on an inner edge of the second yoke part through a second tooth engaging part to form a second lamination; and superposing the first lamination and the second lamination in the axial direction, and aligning the first tooth engaging part to the second tooth engaging part in the axial direction, wherein the first tooth engaging part is different from the second tooth engaging part.

In some embodiments, on the silicon steel sheet, the plurality of first sub-yoke parts are located in a first row, the plurality of second sub-yoke parts are located in a second row, the plurality of first tooth parts are located in a third row, and the plurality of second tooth parts are located in a fourth row, wherein directions of the first row, the second row, the third row, and the fourth row are substantially the same as the rolling direction.

In some embodiments, on the silicon steel sheet, the plurality of first sub-yoke parts are arranged along a first row in a lengthwise direction parallel to the rolling direction, the plurality of first tooth parts are located in arc-shaped regions of the first sub-yoke parts, the plurality of second sub-yoke parts are arranged along a second row in the lengthwise direction parallel to the rolling direction, and the plurality of second tooth parts are located in arc-shaped regions of the second sub-yoke parts.

It should be understood that the foregoing brief description is provided for briefly introducing a series of selected concepts that will be further described in the detailed description. While representative embodiments of the claimed subject matter are described, the scope of the present invention will be uniquely defined by the appended claims as filed and/or amended. Further, the subject under protection is not limited to only those implementations that can overcome one or more disadvantages which are described above or in any part of this description.

In combination with one or a plurality of embodiments described in detail below with reference to accompanying drawings, one or a plurality of features and or advantages of the present invention will become apparent.

BRIEF DESCRIPTION OF THE DRAWINGS

FIG. 5B is an exploded view of the first sub-yoke part and the first tooth part in

FIG. 5A.

DETAILED DESCRIPTION

Figure 1:
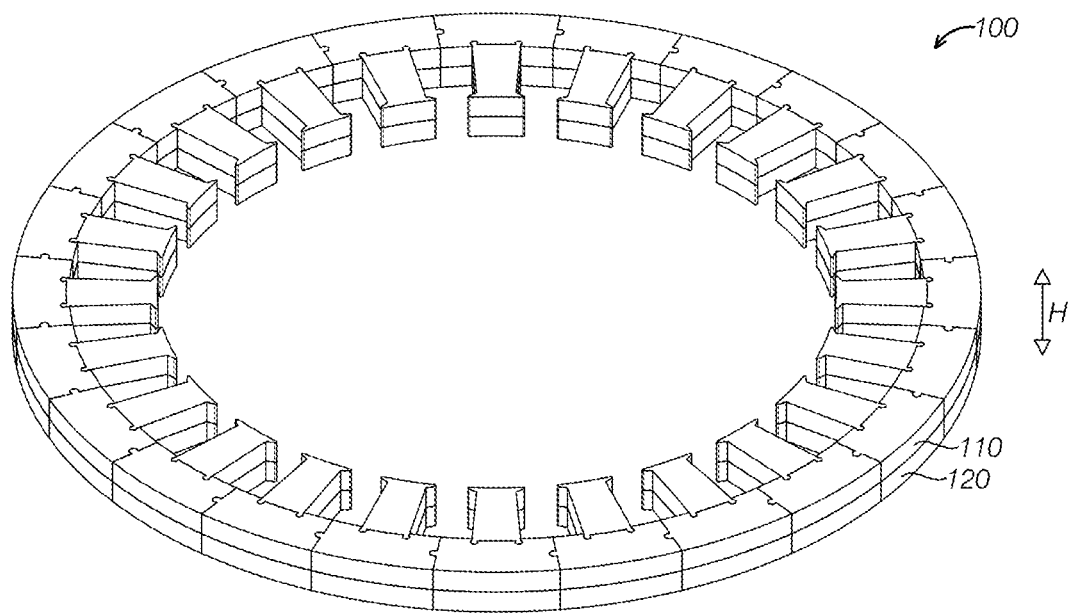
FIG. 1 is a perspective view of a stator for a motor according to an embodiment of the present application; in the figure, a first lamination and a second lamination superposed alternately are shown.

Specific embodiments are disclosed in the description of the present application as needed; however, it should be understood that the embodiments disclosed herein are only examples of the claimed subject matter that can be implemented in a plurality of alternative forms. The accompanying drawings are not necessarily drawn proportionally or to scale; some features may be enlarged or reduced to show details of specific components. The same or similar reference numerals can indicate the same parameters and components or similar modifications and replacements. In the following description, a plurality of operational parameters and components are described in a plurality of conceived embodiments. These specific parameters and components are used in this description as examples only and are not meant to be limiting. Therefore, specific structural and functional details disclosed in the present description should not be construed as limiting, but should be construed merely as a representative basis for teaching those skilled in the art to implement the claimed subject matter in a plurality of forms.

A stator is usually formed by superposing a plurality of silicon steel sheets. When the electromagnetic working region of the stator is in a rolling direction, higher magnetic polarization and lower iron loss can be achieved compared with that in a non-rolling direction. However, approximately 80% of the electromagnetic working region of a conventional stator is in a non-rolling direction because the motor stator structure is obtained by directly stamping or shearing a steel coil or a steel sheet into a given shape. In addition, waste is produced during stamping of a conventional stator; due to the blanking requirement of fixed inner and outer diameters of the stator, the material within the inner diameter cannot be used for other purposes. Even though a spliced stator can be found in the prior art, due to factors such as vibration during motor operation, magnetostriction, and blanking accuracy, conventional spliced stators have low axial (longitudinal) and radial stability, causing such stators to be prone to scattering.

Having considered the superior performance of silicon steel materials in a rolling direction, the material utilization of silicon steel sheets, and the splicing stability of stators in axial and radial directions, the inventor of the present application proposes a motor stator and a method of manufacturing the motor stator. A tooth part and a yoke part of the stator are blanked in a rolling direction of non-oriented silicon steel to ensure the following: that an axis-symmetric direction of the tooth part is consistent with the rolling direction, and that a main electromagnetic working region of the yoke part is also in the rolling direction of the non-oriented silicon steel. That is, the direction of magnetic lines in the main electromagnetic working region of the yoke part is substantially parallel to the rolling direction of the non-oriented silicon steel, thereby capable of improving stator magnetic performance. In addition, one yoke part can be spliced with one tooth part or a plurality of tooth parts. The tooth part and the yoke part can be blanked in combination, which can improve material utilization. The upper and lower laminations have different splicing structures, which can prevent misalignment after assembly. As a result, the splicing stability of the stator in axial and radial directions can be ensured. In the present description, it should be understood that the term "consistent," when used to describe the direction, may mean that two directions are substantially parallel, and may indicate that the two directions are parallel to each other and are oriented to the same direction, or may indicate that the two directions are parallel to each other and are oriented to opposite directions, i.e. at 180 degrees relative to one another.

FIG. 1 is a perspective view of a stator 100 for a motor according to an embodiment of the present application. The stator 100 includes a first lamination 110 and a second lamination 120 superposed in an axial direction H. Although only two laminations are shown in FIG. 1, it should be understood that the stator 100 can include a plurality of first laminations 110 and a plurality of second laminations 120; the first laminations 110 and the second laminations 120 are arranged alternately in the axial direction H. The stator 100 can be used in a new-energy drive motor; for example, the stator can be applied to a round/flat wire permanent magnet synchronous motor with a centralized winding or a distributed winding, a switched reluctance motor, and an induction motor.

Figure 2A:
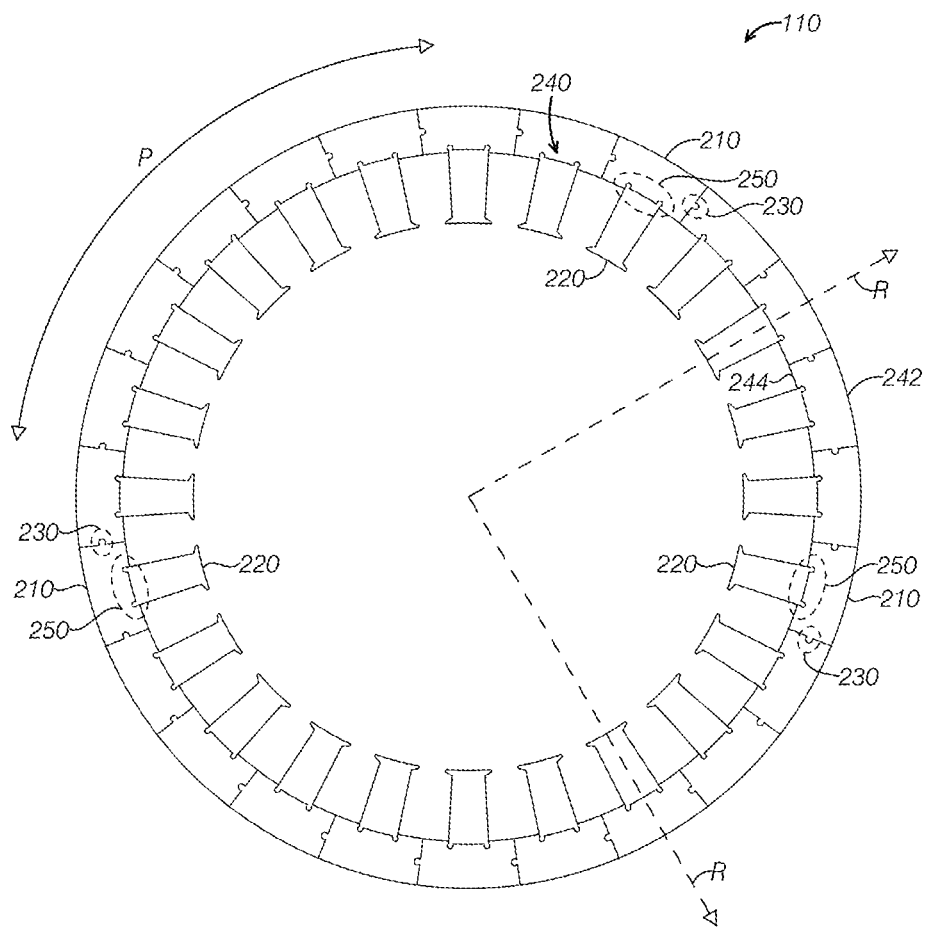
FIG. 2A is a plan view of the first lamination of the motor in FIG. 1.

FIG. 2A is a plan view of the first lamination 110. The first lamination 110 includes a plurality of first sub-yoke parts 210 and a plurality of first tooth parts 220. The plurality of first sub-yoke parts 210 are spliced through a first yoke engaging part 230 to form a substantially annular first yoke part 240. The first yoke part 240 has an outer edge 242 defined by an outer diameter and an inner edge 244 defined by an inner diameter; the first yoke engaging part 230 is located between the outer edge 242 and the inner edge 244. The plurality of first tooth parts 220 are spliced on the inner edge 244 of the first yoke part 240 through a first tooth engaging part 250. The plurality of first tooth parts 220 may be evenly distributed on the inner edge 244 of the first yoke part 240 in a circumferential direction P of the first yoke part 240 and extend in a radial direction R of the stator (for example, a radial direction of the first yoke part 240).

Figure 2B:
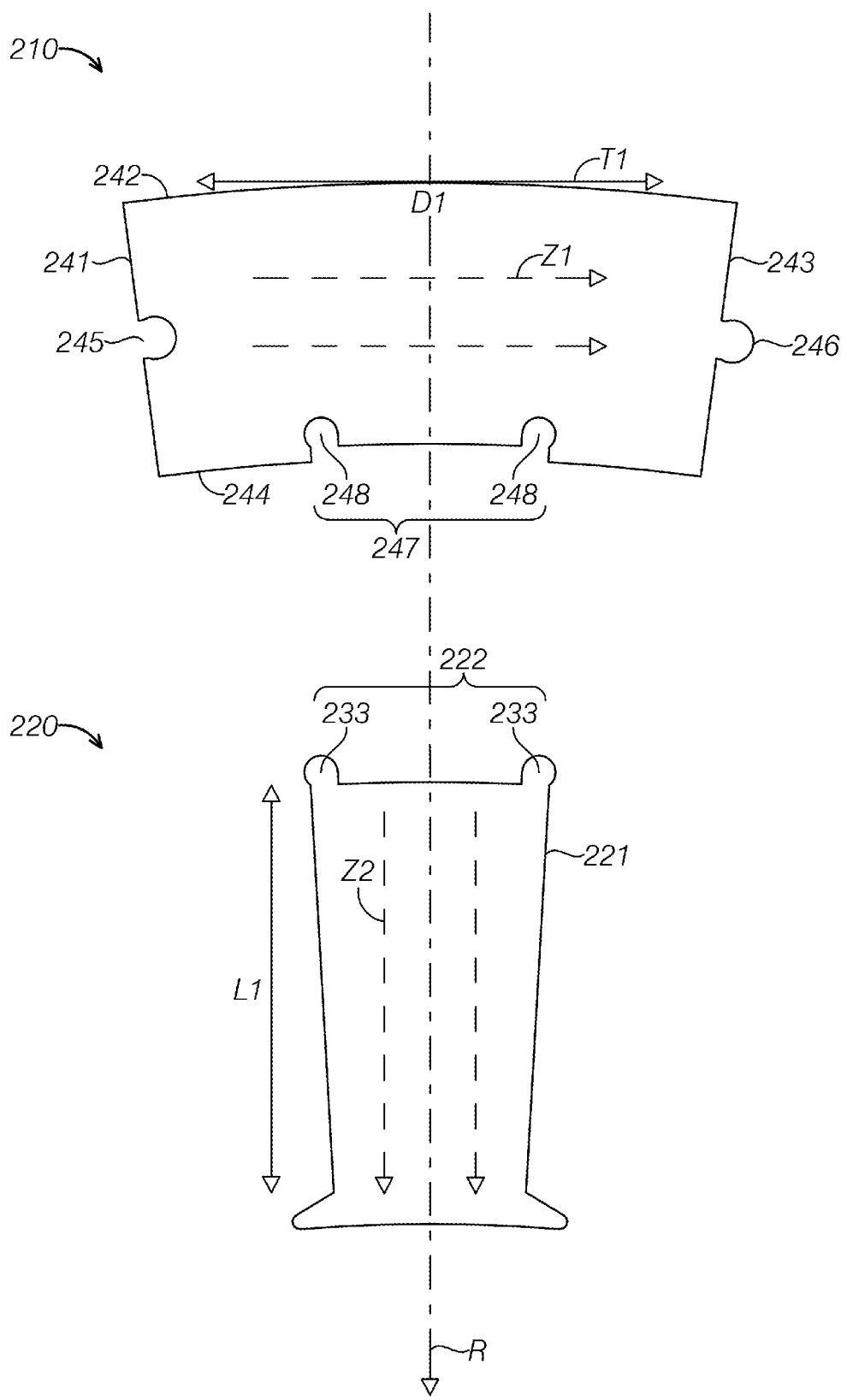
FIG. 2B is an exploded view of a first sub-yoke part and a first tooth part of the first lamination.

FIG. 2B is an exploded view of the first sub-yoke part 210 and the first tooth part 220 of the first lamination 110. The first sub-yoke part 210 has a first side edge 241 and a second side edge 243 that connect the outer edge 242 and the inner edge 244; the first side edge 241 has a recessed first side notch 245, and the second side edge has a protruding first side lug 246. The first side notch 245 and the first side lug 246 are matched with each other structurally. With reference to FIG. 2A, the first side lug 246 of one of two adjacent first sub-yoke parts 210 in the circumferential direction P is received in another first side notch 245; the first side lug 246 and the first side notch 245 of the two first sub-yoke parts 210 constitute the first yoke engaging part 230. A first opening 247 engaged with the first tooth part 220 is provided on the inner edge 244 of the first sub-yoke part 210. The first opening 247 may include at least one first recess. In the embodiment as shown in the drawing, the first opening 247 includes two first notches 248 that are recessed from the inner edge 244 toward the outer edge 242 and are spaced apart.

The first sub-yoke part 210 may be formed by rolling a silicon steel block in a first rolling direction Z1 to form a silicon steel sheet and then stamping or shearing the silicon steel sheet. The first sub-yoke part 210 is substantially arc-shaped, and a tangential direction T1 at an apex D1 of the arc is substantially parallel to the first rolling direction Z1.

An end part 221 of the first tooth part 220 facing the inner edge 244 of the first sub-yoke part 210 has a first protrusion 222, and the first protrusion 222 is receivable in the first opening 247. Therefore, the first opening 247 of the first sub-yoke part 210 and the first protrusion 222 of the first tooth part 220 spliced in the radial direction R constitute the first tooth engaging part 250, as shown in FIG. 2A. The first protrusion 222 may include at least one first lug. In the embodiment shown in the drawing, the first protrusion 222 includes two first lugs 223 that protrude from the end part 221 toward the inner edge 244 of the first sub-yoke part 210 and are spaced apart; the first lugs 223 have shapes matching with the first notches 248 of the first sub-yoke part 210, therefore being receivable in the first notches 248 after splicing.

The first tooth part 220 may be formed by rolling a silicon steel block in a second rolling direction Z2 to form a silicon steel sheet and then stamping or shearing the silicon steel sheet. The first tooth part 220 is substantially rectangular and has a first lengthwise direction L1 substantially parallel to the radial direction R, and the first lengthwise direction L1 is substantially parallel to the second rolling direction Z2.

The first sub-yoke part 210 and the first tooth part 220 may be manufactured by stamping or shearing different silicon steel sheets. In the process of manufacturing the first sub-yoke part 210, the tangential direction T1 at the apex of the arc of the formed first sub-yoke part 210 is made to be substantially parallel to the rolling direction Z1 of the silicon steel sheet. In the process of manufacturing the first tooth part 220, the first lengthwise direction L1 of the formed first tooth part 220 is made to be substantially parallel to the rolling direction Z2 of the silicon steel sheet. Alternatively, the first sub-yoke part 210 and the first tooth part 220 may be formed by stamping or shearing the same silicon steel sheet; that is, the first rolling direction Z1 is the second rolling direction Z2. The manufacturing process causes the tangential direction at the apex of the arc of the formed first sub-yoke part 210 and the first lengthwise direction of the first tooth part 220 to be substantially parallel to the rolling direction of the silicon steel sheet.

Figure 3A:
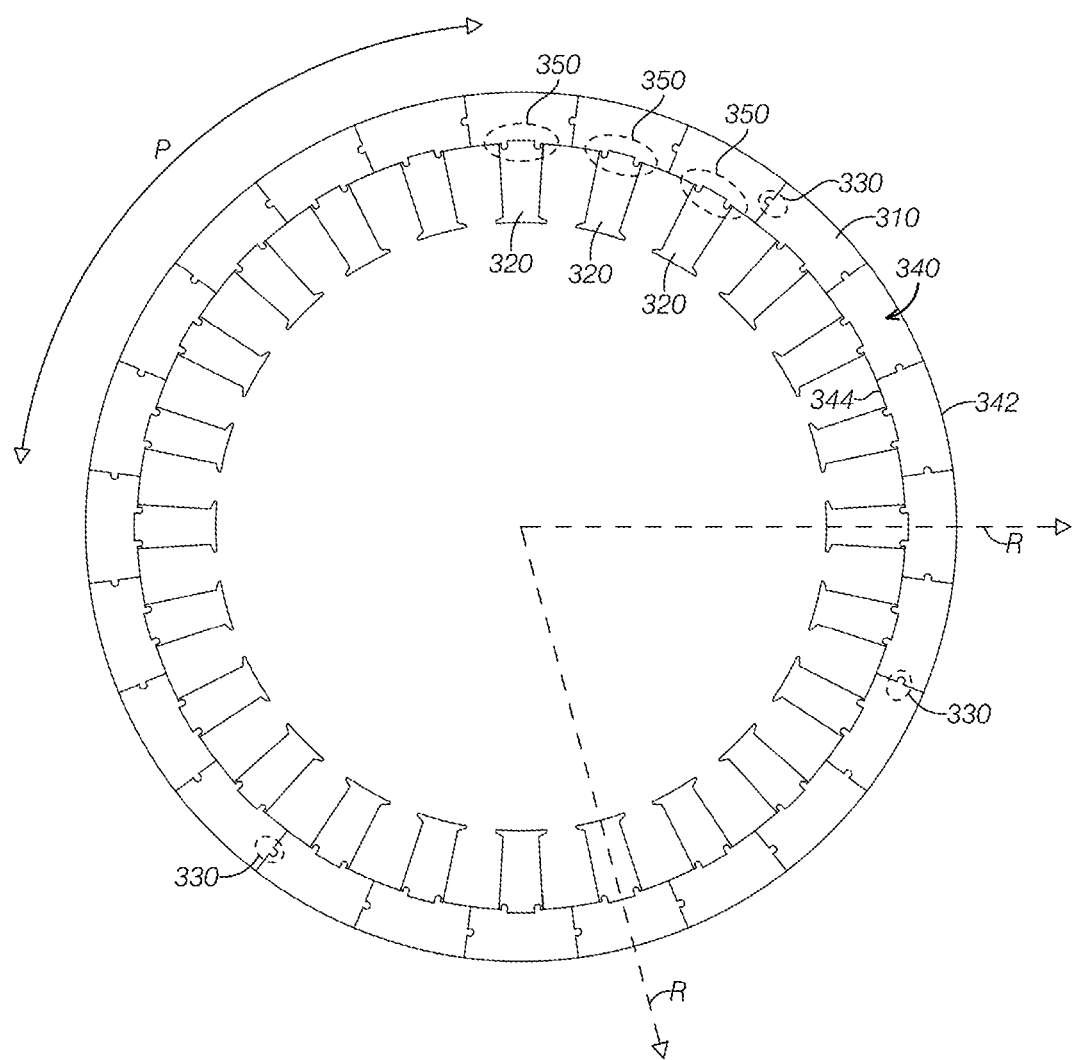
FIG. 3A is a plan view of the second lamination of the motor in FIG. 1.

FIG. 3A is a plan view of the second lamination 120. After splicing, the second lamination 120 has a shape substantially the same as that of the first lamination 110. The second lamination 120 includes a plurality of second sub-yoke parts 310 and a plurality of second tooth parts 320. The plurality of second sub-yoke parts 310 are spliced through a second yoke engaging part 330 to form a substantially annular second yoke part 340. The second yoke part 340 has an outer edge 342 and an inner edge 344 both defined by an inner diameter, and the second yoke engaging part 330 is located between the outer edge 242 and the inner edge 244. The plurality of second tooth parts 320 are spliced on the inner edge 344 of the second yoke part 340 through a second tooth engaging part 350. The plurality of second tooth parts 320 may be evenly distributed on the inner edge 344 of the second yoke part 340 in a circumferential direction P of the stator (e.g., a circumferential direction of the second yoke part 340) and extend in a radial direction R (e.g., a radial direction of the second yoke part 340).

Figure 3B:
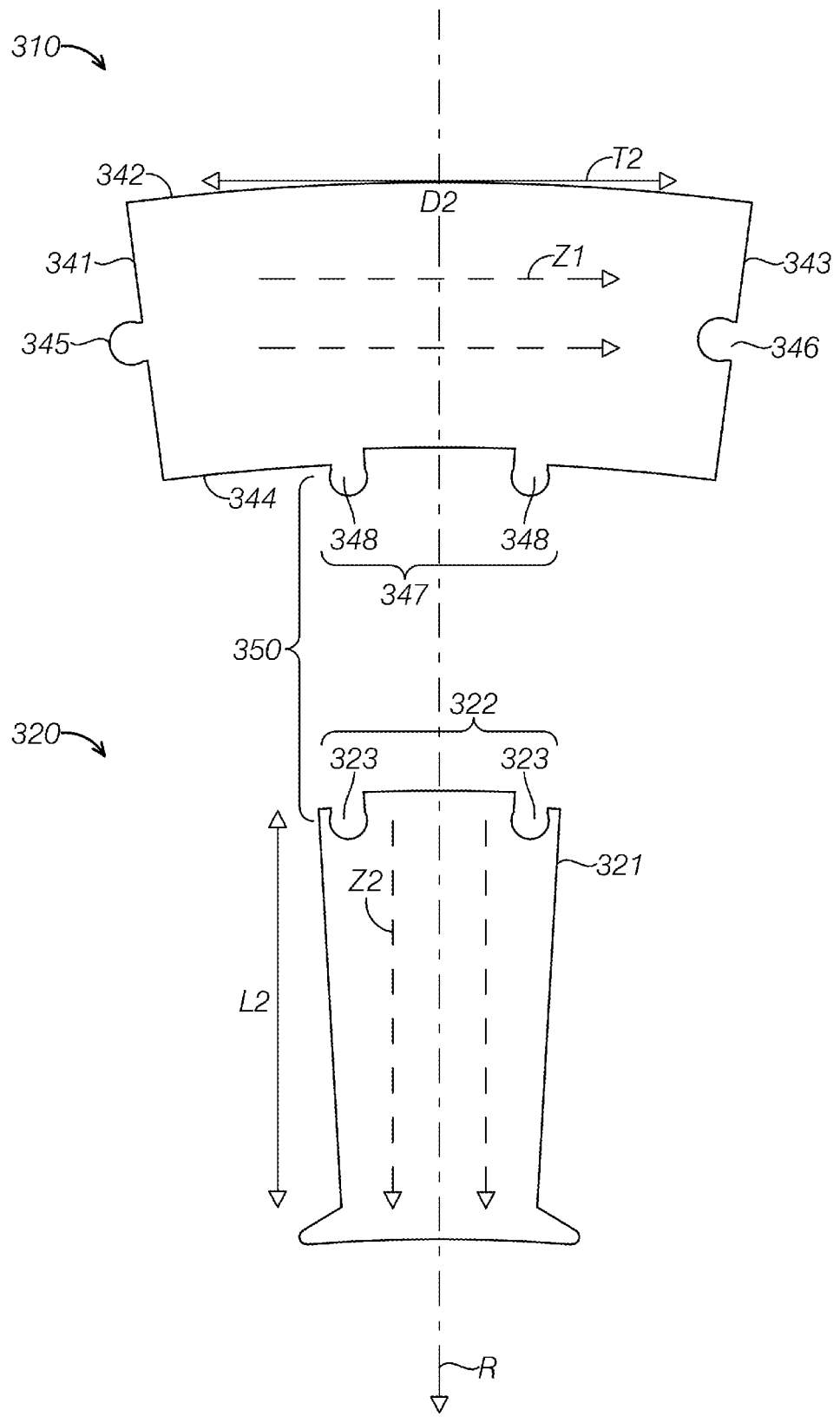
FIG. 3B is an exploded view of a second sub-yoke part and a second tooth part of the second lamination.

FIG. 3B is an exploded view of the second sub-yoke part 310 and the second tooth part 320 of the second lamination 120. The second sub-yoke part 310 has a first side edge 341 and a second side edge 343 that connect the outer edge 342 and the inner edge 344; the first side edge 341 has a protruding second side lug 345, and the second side edge 343 has a recessed second side notch 346. The second side lug 345 and the second side notch 346 are matched with each other structurally. As shown in FIG. 3A, as for two adjacent second sub-yoke parts 310 in the circumferential direction P, the second side lug 345 of one of the second sub-yoke parts 310 is received in the second side notch 346 of the other second sub-yoke part 310, and the second side lug 345 and the second side notch 346 of the two second sub-yoke parts 310 constitute the second yoke engaging part 330. At least one second protrusion 347 engaged with the second tooth part 320 is provided on the inner edge 344 of the second sub-yoke part 310. In the embodiment as shown in the drawing, the second protrusion 347 may include two second lugs 348 that protrude from the inner edge 344 toward the second tooth part 320.

The second sub-yoke part 310 and the first sub-yoke part 210 may be formed by stamping or shearing the same silicon steel sheet. In such an embodiment, the second sub-yoke part 310 is substantially arc-shaped, and a tangential direction T2 at an apex D2 of the arc is parallel to the first rolling direction Z1. Alternatively, the second sub-yoke part 310 and the first sub-yoke part 210 may be manufactured from different silicon steel sheets. In such an embodiment, the tangential directions at the apexes of respective arcs are parallel to the rolling directions of the respective silicon steel sheets.

As also shown in FIG. 3B, an end part 321 of the second tooth part 320 facing the inner edge 344 of the second sub-yoke part 310 has a second opening 322, and the second protrusion 347 of the second sub-yoke part 310 is receivable in the second opening 322. Therefore, the second protrusion 347 of the second sub-yoke part 310 and the second opening 322 of the second tooth part 320 spliced in the radial direction R constitute the second tooth engaging part 350. The second opening 322 includes at least one second notch 323 that is recessed from the end part 321 in a direction away from the inner edge 344 of the second sub-yoke part 310. In the embodiment as shown in the drawing, the second opening 322 includes two second notches 323 spaced apart from each other, and the second lugs 348 have shapes matching with the second notches 323 of the second sub-yoke part 310, thus being receivable in the second notches 323 after splicing.

The second tooth part 320 and the first tooth part 220 may be formed by stamping or shearing the same silicon steel sheet. In such an embodiment, the second tooth part 320 is substantially rectangular and has a second lengthwise direction L2 substantially parallel to the radial direction R, and the second lengthwise direction L2 is parallel to the second rolling direction Z2. Alternatively, the second tooth part 320 and the first tooth part 220 may be manufactured from different silicon steel sheets; in such an embodiment, the respective lengthwise directions are parallel to the rolling directions of the respective silicon steel sheets.

The second sub-yoke part 310 and the second tooth part 320 may be manufactured by stamping or shearing different silicon steel sheets. The manufacturing process causes the tangential direction at the apex of the arc of the formed second sub-yoke part 310 and the lengthwise direction of the second tooth part 320 to be parallel to the rolling directions of the respective silicon steel sheets. Alternatively, the second sub-yoke part 310 and the second tooth part 320 may be formed by stamping or shearing the same silicon steel sheet; that is, the first rolling direction Z1 is the second rolling direction Z2. The manufacturing process causes the tangential direction at the apex of the arc of the formed second sub-yoke part 310 and the lengthwise direction of the second tooth part 320 to be parallel to the rolling direction of the silicon steel sheet.

In one embodiment, the first sub-yoke part 210, the first tooth part 220, the second sub-yoke part 310, and the second tooth part 320 are manufactured from the same silicon steel sheet, and the stamping or shearing process causes the tangential direction at the apex of the arc of the first sub-yoke part 210, the lengthwise direction of the first tooth part 220, the tangential direction at the apex of the arc of the second sub-yoke part 310, and the lengthwise direction of the second tooth part 320 to each be parallel to the rolling direction of the silicon steel sheet. As such, the material utilization of the silicon steel sheet and the magnetic performance of the spliced stator can be improved.

With references to FIGS. 2A, 2B, 3A and 3B, the first yoke engaging part 230 and the second yoke engaging part 330 aligned in the axial direction H are different, and thus the first yoke part 240 and the second yoke part 340 will not be easily scattered in the axial direction H. The first tooth engaging part 250 and the second tooth engaging part 350 aligned in the axial direction H are different, and thus the first tooth part 220 and the second tooth part 320 will not be easily scattered in the axial direction H. As a result, the following problem can be alleviated: a row of tooth stacks or a row of sub-yoke stacks as a whole is detached in the axial direction H due to identical structures of the yoke engaging parts and the tooth engaging parts; and the axial stability of the stator can be improved.

As shown in FIG. 2A, as for the first lamination 110, the quantity of the first sub-yoke parts 210 is the same as the quantity of the first tooth parts 220, and one first tooth part 220 is spliced to an inner edge 244 of one first sub-yoke part 210. Please refer to FIG. 3A. Similarly, as for the second lamination 120, the quantity of the second sub-yoke parts 310 is the same as the quantity of the second tooth parts 320, and one second tooth part 320 is spliced to an inner edge 344 of one second sub-yoke part 310.

Figure 4A:
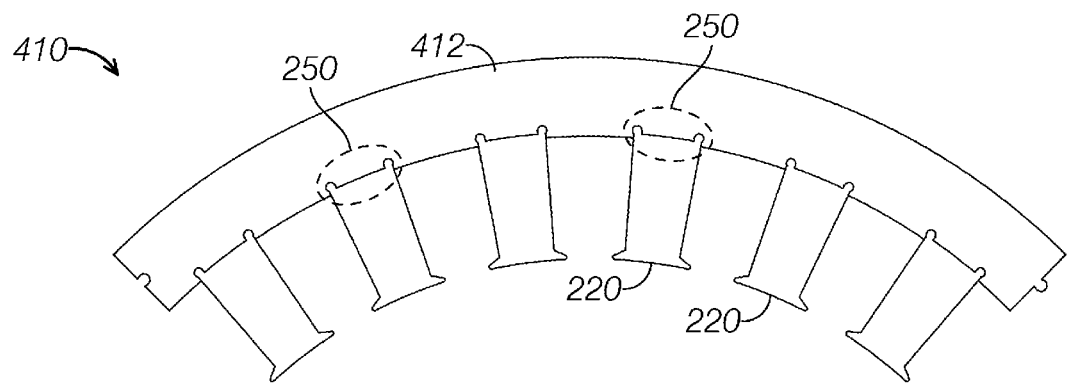
FIG. 4A is a plan view of a part of a first lamination of a motor according to another embodiment of the present application.
Figure 4B:
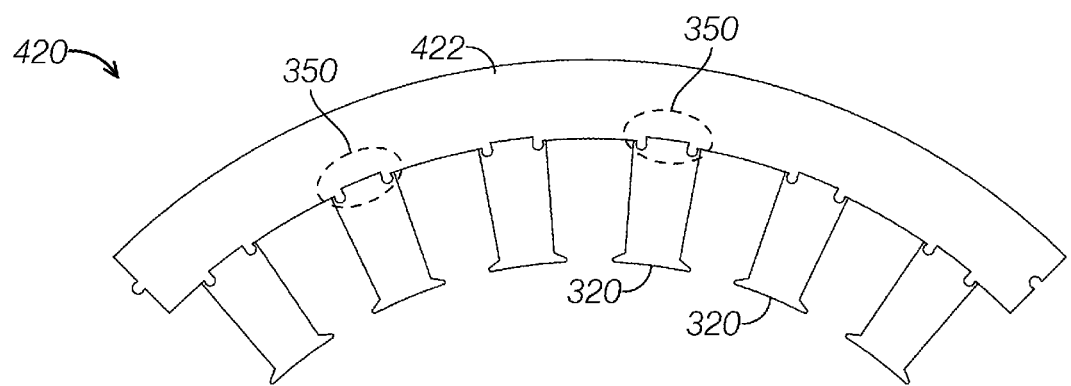
FIG. 4B is a plan view of a part of a second lamination of the motor in FIG. 4A.

The stator of the present application is not limited to the embodiment shown in FIG. 2A and FIG. 3A, in which one sub-yoke part corresponds to one tooth part. The stator of the present application further includes an embodiment in which a plurality of tooth parts corresponds to one sub-yoke part. FIG. 4A and FIG. 4B show a first lamination 410 and a second lamination 420 of a motor stator according to another embodiment of the present application. When compared with the embodiment shown in FIG. 2A, the first lamination 410 of FIG. 4A is different only in the first sub-yoke part; thus, the same reference numerals in FIG. 2A and FIG. 4A indicate the same components. Please refer to FIG. 4A. The first lamination 410 includes a plurality of first sub-yoke parts 412 (only one first sub-yoke part is shown in FIG. 4A) and a plurality of first tooth parts 220; the quantity of the first sub-yoke parts 412 is less than the quantity of the first tooth parts 220, and a plurality of first tooth parts 220 are spliced to an inner edge of one first sub-yoke part 412 through a plurality of first tooth engaging parts 250. Except regarding how the shape and the size of the first sub-yoke part 412 in FIG. 4A are different from those of the first sub-yoke part 210 in FIG. 2A, it should be understood that other structural features (e.g., the first yoke engaging part) and the manufacturing process of the first sub-yoke part 412 can be obtained with reference to the description of the first sub-yoke part 210.

When compared with the embodiment shown in FIG. 3A, the second lamination 420 of FIG. 4B is different only in the second sub-yoke part; thus, the same reference numerals in FIG. 4B and FIG. 3A indicate the same components. Please refer to FIG. 4B. The second lamination 420 includes a plurality of second sub-yoke parts 422 (only one second sub-yoke part is shown in FIG. 4B) and a plurality of second tooth parts 320; the quantity of second sub-yoke parts 422 is less than the quantity of the second tooth parts 320, and a plurality of second tooth parts 320 are spliced to an inner edge of one second sub-yoke parts 422 through a plurality of second tooth engaging parts 350. Except regarding how the shape and the size of the second sub-yoke part 422 in FIG. 4B are different from those of the second sub-yoke part 310 in FIG. 3A, it should be understood that other structural features (e.g., the second yoke engaging part) and the manufacturing process of the second sub-yoke part 422 can be obtained with reference to the description of the second sub-yoke part 310. Quantity reduction of the sub-yoke parts simplifies the assembly process, thereby improving stator manufacturing efficiency.

Figure 5A:
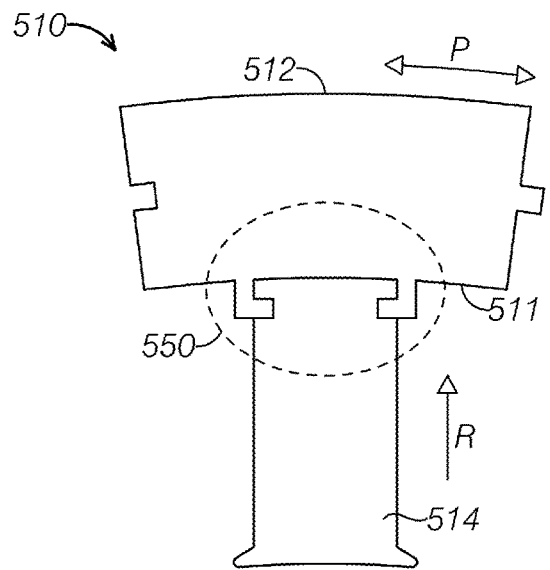
FIG. 5A is a plan view showing a spliced state of a first sub-yoke part and a first tooth part of a first lamination of a motor according to another embodiment of the present application.
Figure 5C:
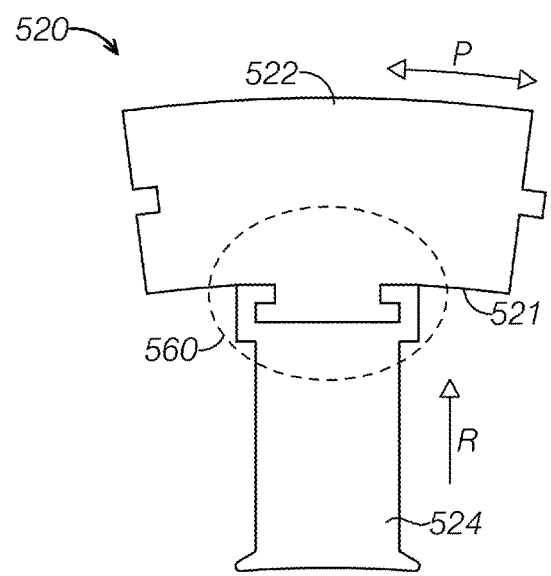
FIG. 5C is a plan view showing a spliced state of a second sub-yoke part and a second tooth part of a second lamination corresponding to the first lamination in FIG. 5A.
Figure 5B:
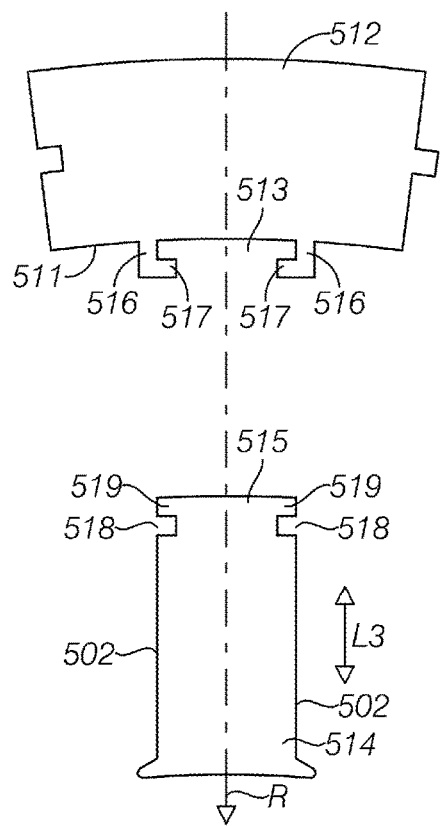
Figure 5D:
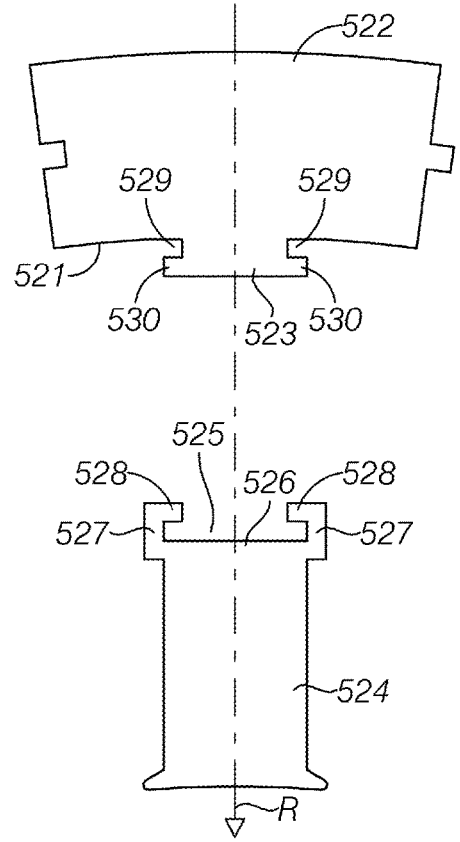
FIG. 5D is an exploded view of the second sub-yoke part and the second tooth part in FIG. 5C.

FIG. 5A shows a part of a first lamination 510 of a motor stator according to another embodiment of the present application. FIG. 5B is an exploded view of a first sub-yoke part and a first tooth part of the first lamination 510. FIG. 5C shows a part of a second lamination 520 of the motor stator corresponding to the first lamination 510 of the embodiment in FIG. 5A and FIG. 5B. FIG. 5D is an exploded view of a second sub-yoke part and a second tooth part of the second lamination 520.

As shown in FIGS. 5A and 5B, a difference between the first lamination 510 and the first lamination 210 of FIG. 2A lies in the first tooth engaging part 550. Therefore, except the first tooth engaging part 550, other features of the first lamination 510 may be obtained with reference to the first lamination 210 of FIG. 2A. The first lamination 510 includes a plurality of first sub-yoke parts 512 and a plurality of first tooth parts 514; the plurality of first sub-yoke parts 512 are spliced to form an annular first yoke part (not shown), and the plurality of first tooth parts 514 are spliced to inner edges 511 of the first sub-yoke parts 512 through the first tooth engaging parts 550. The first tooth engaging part 550 includes a first opening 513 located at the first sub-yoke part 512 and a first protrusion 515 located at the first tooth part 514. The first opening 513 is defined by two first legs 516 that extend from the inner edge 511 toward the first tooth part 514; the two first legs 516 are spaced apart from each other and have first protruding parts 517 extending toward each other; the first legs 516 are generally L-shaped; and the two first legs 516 are arranged mirror-symmetrically in relation to a radial direction R.

The first protrusion 515 of the first tooth part 514 is located at an end part of the first tooth part 514 facing the first sub-yoke part 512, and includes first grooves 518 on both side edges 502 of the first tooth part 514 in a lengthwise direction L3 and first tooth protruding parts 519 located above the first grooves 518. The first tooth protruding parts 519 are receivable in the first opening 513 of the first sub-yoke part 512; the first protruding parts 517 of the first sub-yoke part 512 are receivable in the first grooves 518; and the movement of the first tooth part 514 in the circumferential direction P and in the radial direction R can be limited, thus improving the splicing stability of the first tooth part 514 and the first sub-yoke part 512.

With reference to FIGS. 5C and 5D, a difference between the second lamination 520 and the second lamination 310 of FIG. 3A lies in the second tooth engaging part 560. Therefore, except the second tooth engaging part 560, other features of the second lamination 520 may be obtained with reference to the second lamination 310 in FIG. 3A. The second lamination 520 includes a plurality of second sub-yoke parts 522 and a plurality of second tooth parts 524; the plurality of second sub-yoke parts 522 are spliced to form an annular second yoke part (not shown); and the plurality of second tooth parts 524 are spliced to an inner edge 521 of the second yoke part through the second tooth engaging parts 560. The second tooth engaging part 560 includes a second protrusion 523 located on the inner edge 521 of the second sub-yoke part 522 and a second opening 525 located at an end part of the second tooth part 524. The second opening 525 is defined by two second legs 527 that extend from an end surface 526 of the second tooth part 524 facing the second sub-yoke part 522 toward the second sub-yoke part 522; the two second legs 527 are spaced apart from each other and have second protruding parts 528 extending toward each other; the second legs 527 are generally C-shaped; and the two second legs 527 are arranged mirror-symmetrically in relation to the radial direction R. The second protrusion 523 of the second sub-yoke part 522 includes two second sub-yoke protruding parts 530, and the two second sub-yoke protruding parts 530 are spaced apart from the inner edge 521 of the second sub-yoke part 522 to form two second grooves 529. The second sub-yoke protruding parts 530 are receivable in the second opening 525 of the second tooth part 524; the second protruding parts 528 of the second tooth part 524 are receivable in the second grooves 529 of the second sub-yoke part 522; and the movement of the second tooth part 524 in the circumferential direction P and the radial direction R can be limited, thus improving the stability of splicing the second tooth part 524 and the first sub-yoke part 512.

Figure 6A:
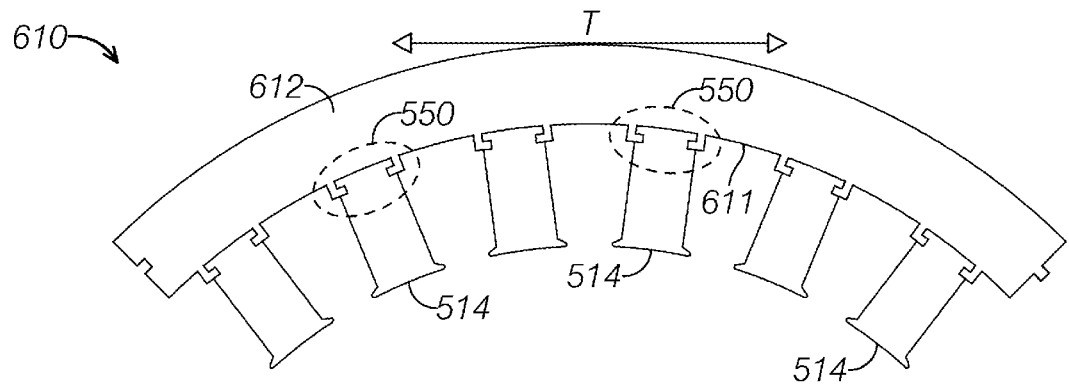
FIG. 6A is a plan view of a part of a first lamination of a motor according to another embodiment of the present application.
Figure 6B:
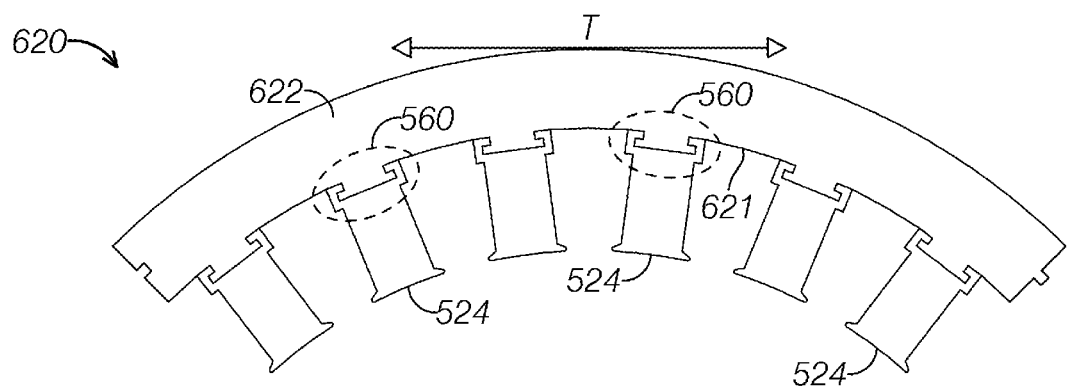
FIG. 6B is a plan view of a part of a second lamination of the corresponding motor in FIG. 6A.

FIG. 6A and FIG. 6B show a part of a first lamination 610 and a part of a second lamination 620 of another motor stator according to an embodiment of the present application. One of sub-yoke parts constituting the first lamination 610 and the second lamination 620 corresponds to a plurality of tooth parts. When compared with the embodiment shown in FIG. 5A, the first lamination 610 of FIG. 6A is different only in that the first sub-yoke part corresponds to the plurality of first tooth parts; thus, the same reference numerals in FIG. 6A and FIG. 5A indicate the same components. Please refer to FIG. 6A. The first lamination 610 includes a plurality of first sub-yoke parts 612 (only one first sub-yoke part is shown in FIG. 6A) and a plurality of first tooth parts 514; the quantity of the first sub-yoke parts 612 is less than the quantity of the first tooth parts 514; and a plurality of first tooth parts 514 are spliced to an inner edge 611 of one first sub-yoke part 612 through a plurality of first tooth engaging parts 550. Except regarding how the shape and the size of the first sub-yoke part 612 in FIG. 6A are different from those of the first sub-yoke part 512 in FIG. 5A, it should be understood that other structural features (e.g., the first yoke engaging part and the first tooth engaging part) and the manufacturing process (e.g., formed by rolling a silicon steel sheet, a tangential direction T at an apex of the arc being parallel to the rolling direction of the silicon steel sheet) of the first sub-yoke part 612 can be obtained with reference to the description of the first sub-yoke part 512.

When compared with the embodiment shown in FIG. 5C, the second lamination 620 of FIG. 6B is different only in that one second sub-yoke part corresponds to a plurality of second tooth parts; thus, the same reference numerals in FIG. 6B and FIG. 5D indicate the same components. Please refer to FIG. 6B. The second lamination 620 includes a plurality of second sub-yoke parts 622 (only one second sub-yoke part is shown in FIG. 6B) and a plurality of second tooth parts 524; the quantity of second sub-yoke parts 622 is less than the quantity of the second tooth parts 524; and a plurality of second tooth parts 524 are spliced to an inner edge 621 of one second sub-yoke part 622 through a plurality of second tooth engaging parts 560. Except regarding how the shape and the size of the second sub-yoke part 622 in FIG. 6B are different from those of the second sub-yoke part 522 in FIG. 5D, it should be understood that other structural features (e.g., the second yoke engaging part and the second tooth engaging part) and the manufacturing process (e.g., formed by rolling a silicon steel sheet, a tangential direction T at an apex of the arc being parallel to the rolling direction of the silicon steel sheet) of the second sub-yoke part 622 can be obtained with reference to the description of the second sub-yoke part 520. Quantity reduction of the sub-yoke parts simplifies the assembly process, thereby improving stator manufacturing efficiency.

Figure 7:
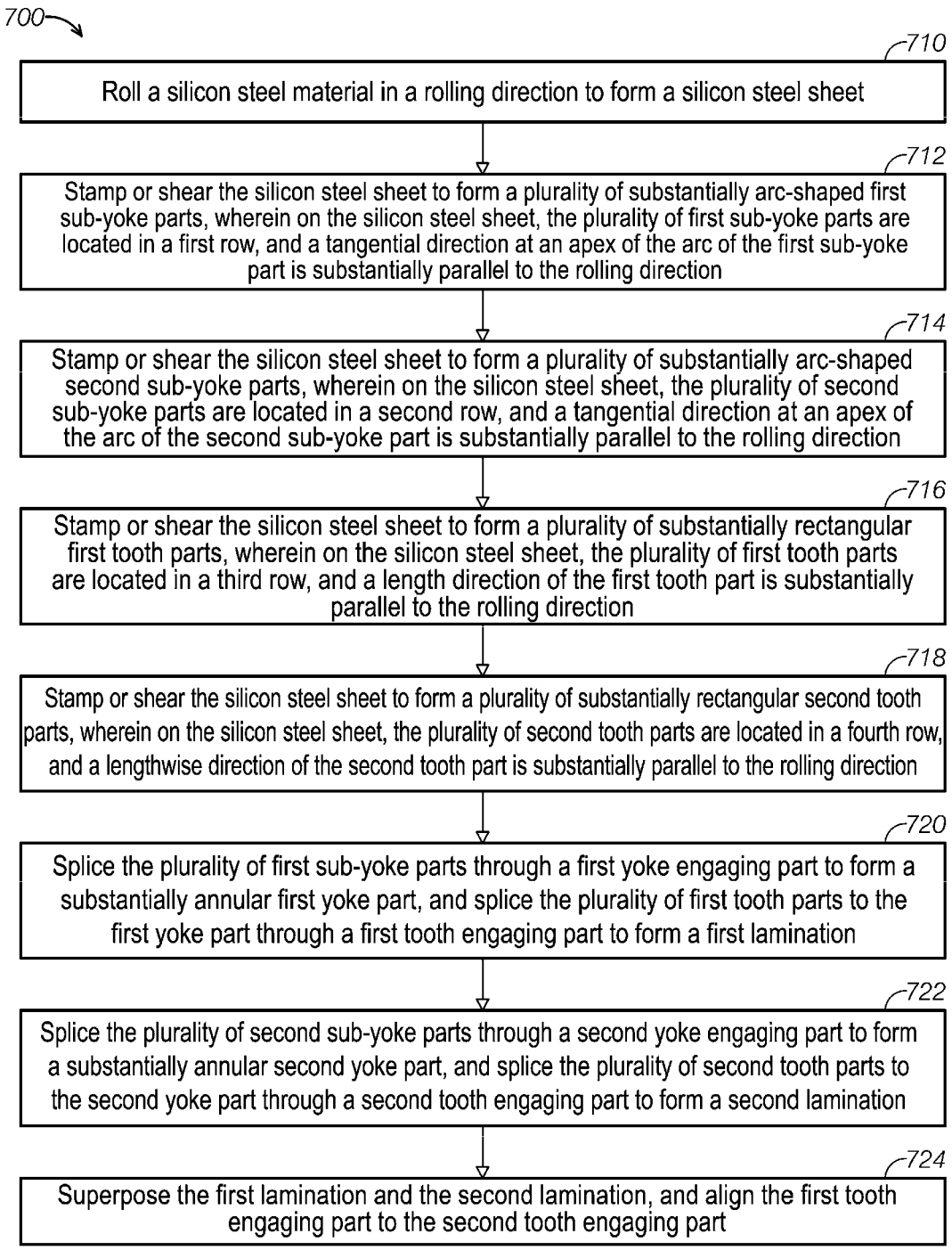
FIG. 7 is a flowchart of a method of manufacturing a motor stator according to an embodiment of the present application.

FIG. 7 is a flowchart of a method 700 of manufacturing a motor stator according to an embodiment of the present application. As represented at 710, a silicon steel material is rolled in a rolling direction to form a silicon steel sheet. In 712, the silicon steel sheet is stamped or sheared to form a plurality of substantially arc-shaped first sub-yoke parts. On the silicon steel sheet, the plurality of first sub-yoke parts is located in a first row, and a tangential direction at an apex of the arc of the first sub-yoke part is substantially parallel to the rolling direction. The first sub-yoke part includes a first yoke engaging part located on a side edge thereof and a first yoke opening located on an inner edge thereof. The first yoke opening is a part of the first tooth engaging part. In some embodiments, the first yoke engaging part has the structure as shown in FIG. 1 to FIG. 5B. The first tooth engaging part includes the first yoke opening. The first yoke opening has the structure as shown in FIG. 2A and FIG. 2B. In other embodiments, the first yoke opening has the structure as shown in FIG. 5A and FIG. 5B.

As represented at 714, the silicon steel sheet is stamped or sheared to form a plurality of substantially arc-shaped second sub-yoke parts. On the silicon steel sheet, the plurality of second sub-yoke parts are located in a second row, and a tangential direction at an apex of the arc of the second sub-yoke part is substantially parallel to the rolling direction. The second sub-yoke part includes a second yoke engaging part located on a side edge thereof and a second yoke protrusion located on an inner edge thereof. In some embodiments, the second yoke engaging part has the structure as shown in FIG. 1 to FIG. 5B. The second yoke protrusion is a part of a second tooth engaging part. In some embodiments, the second yoke protrusion has the structure as shown in FIG. 3A and FIG. 3B. In other embodiments, the first yoke opening has the structure as shown in FIG. 5C and FIG. 5D.

In 716, the silicon steel sheet is stamped or sheared to form a plurality of substantially rectangular first tooth parts. On the silicon steel sheet, the plurality of first tooth parts are located in a third row, and a lengthwise direction of the first tooth part is substantially parallel to the rolling direction. The first tooth part includes a first tooth protrusion located at an end part thereof. The first tooth protrusion is a part of the first tooth engaging part and constitutes the first tooth engaging part together with the first yoke opening. In some embodiments, the first tooth protrusion has the structure as shown in FIG. 2B. In other embodiments, the first tooth protrusion has the structure as shown in FIG. 5A and FIG. 5B.

The silicon steel sheet is stamped or sheared to form a plurality of substantially rectangular second tooth parts as represented at 718. On the silicon steel sheet, the plurality of second tooth parts are located in a fourth row, and a lengthwise direction of the second tooth part is substantially parallel to the rolling direction. The second tooth part includes a second tooth opening located at an end part thereof. The second tooth opening is a part of the second tooth engaging part and constitutes the second tooth engaging part together with the second yoke opening. In some embodiments, the second tooth opening has the structure as shown in FIG. 2B. In other embodiments, the second tooth opening and the first tooth opening together constitute the first tooth engaging part. The second tooth opening has the structure as shown in FIG. 5C and FIG. 5D.

In 720, the plurality of first sub-yoke parts is spliced through the first yoke engaging part to form a substantially annular first yoke part, and the plurality of first tooth parts are spliced to the first yoke part through the first tooth engaging part to form a first lamination. In 722, the plurality of second sub-yoke parts are spliced to form a substantially annular second yoke part through the second yoke engaging part, and the plurality of second tooth parts are spliced to the second yoke part through the second tooth engaging part to form a second lamination. In 724, the first and second laminations are superposed, and the first tooth engaging part is made to align to the second tooth engaging part.

Figure 8A:
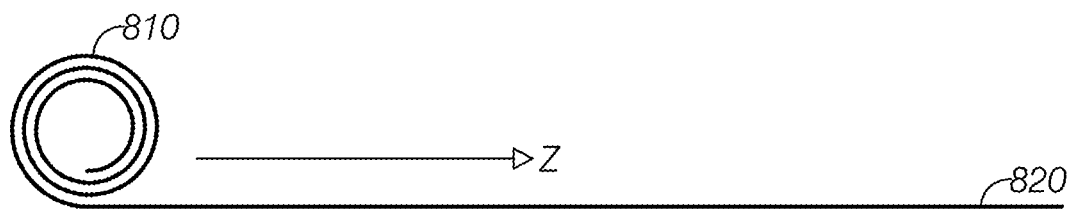
FIG. 8A is a schematic view of a silicon steel material for manufacturing a motor stator before rolling; in the figure, a rolling direction is shown.
Figure 8B:
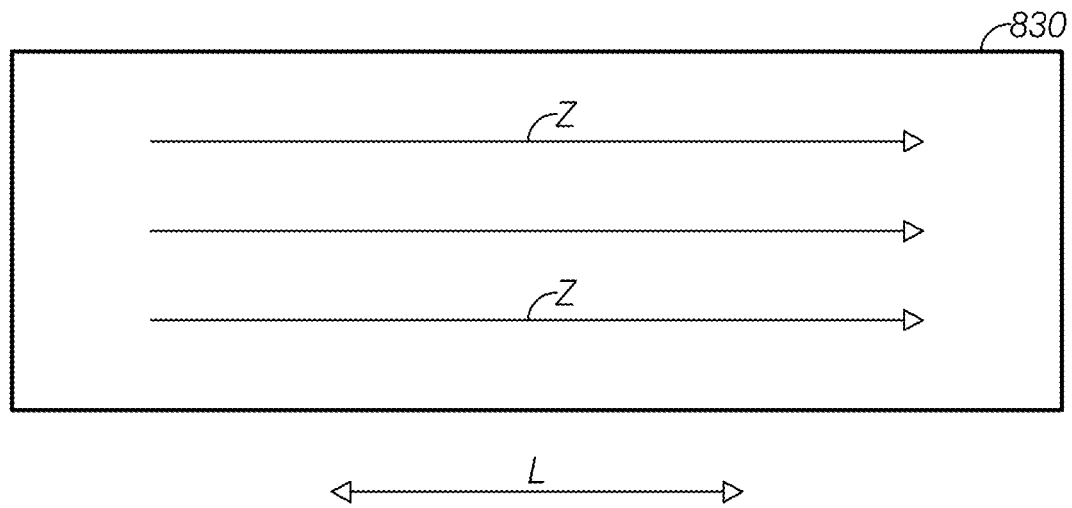
FIG. 8B is a schematic view of the silicon steel material for manufacturing the motor stator after rolling; in the figure, the rolling direction and a lengthwise direction of the silicon steel material are shown.

FIG. 8A and FIG. 8B show a silicon steel material before and after rolling, respectively. As shown in FIG. 8A, a silicon steel block 820 is rolled in a rolling direction Z by a rolling tool 810. As shown in FIG. 8B, a lengthwise direction L of the rolled silicon steel sheet 830 is parallel to the rolling direction Z.

Figure 9:
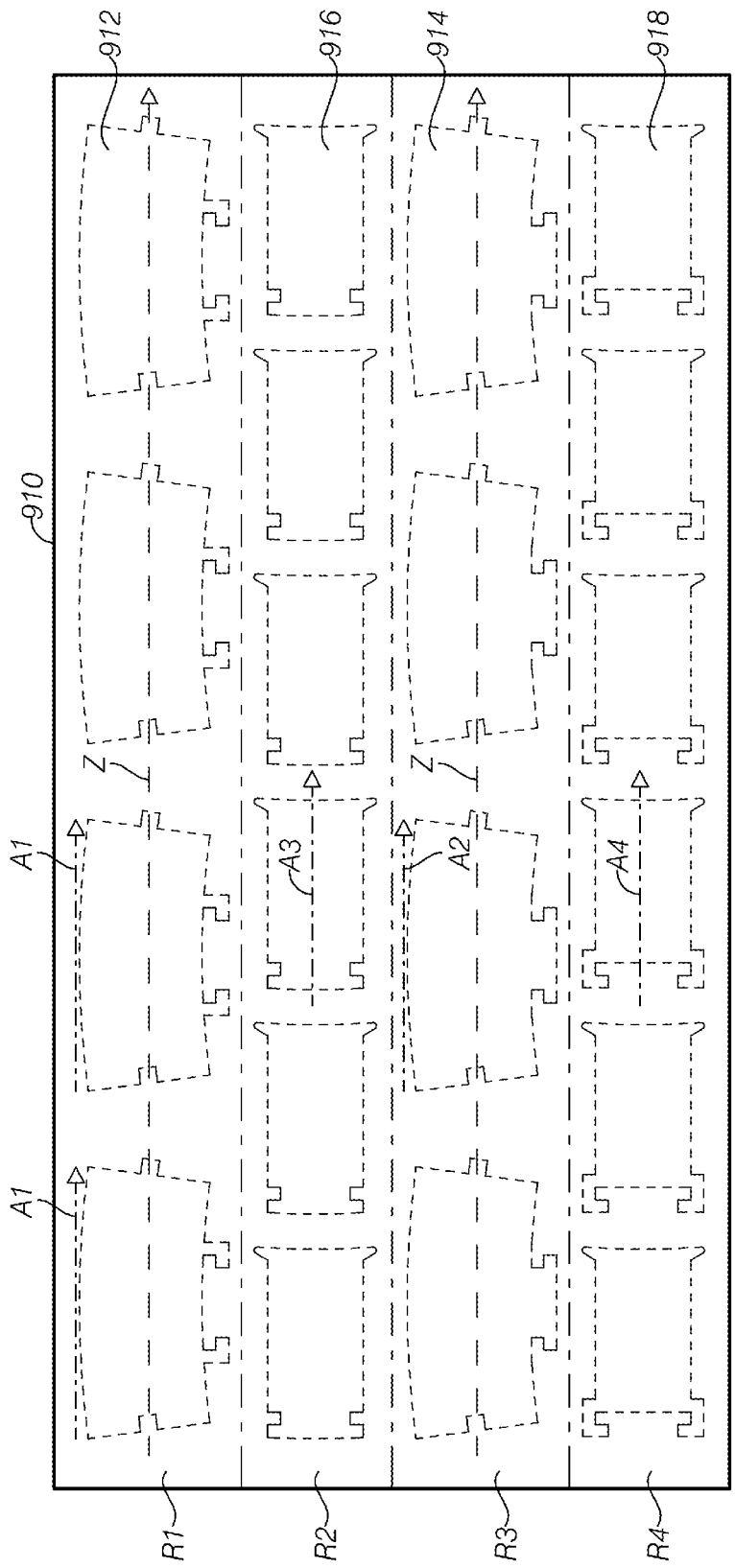
FIG. 9 shows an arrangement of sub-yoke parts and tooth parts on a silicon steel sheet prior to the stamping from the method of FIG. 7.

FIG. 9 shows a silicon steel sheet 910 before stamping in the method 700 according to an embodiment of the present application. Dashed lines indicate positions of sub-yoke parts and tooth parts on the silicon steel sheet 910 before the stamping. A plurality of first sub-yoke parts 912 are located in a first row R1. A tangential direction A1 at an apex of an arc of the first sub-yoke part 912 is parallel to the rolling direction of the silicon steel sheet. A plurality of second sub-yoke parts 914 are located in a second row R2. A tangential direction A2 at an apex of an arc of the second sub-yoke part 914 is parallel to the rolling direction of the silicon steel sheet. First tooth parts 916 are located in a third row R3. A lengthwise direction A3 of the first tooth part 916 is parallel to the rolling direction of the silicon steel sheet. Second tooth parts 918 are located in a fourth row R4. A lengthwise direction A4 of the second tooth part 918 is parallel to the rolling direction Z. The plurality of first sub-yoke parts 912, the plurality of first tooth parts 916, the plurality of second sub-yoke parts 914, and the plurality of second tooth parts 918 may be rolled in a lengthwise direction parallel to the rolling direction Z; as such, the material utilization of the silicon steel sheet can reach at least 85%.

In the embodiment shown in FIG. 9, the first row R1, the second row R2, the third row R3, and the fourth row R4 are arranged in numerical order in a direction perpendicular to the rolling direction. It should be understood that the first row R1, the second row R2, the third row R3, and the fourth row R4 does not have to be arranged in numerical order in the direction perpendicular to the rolling direction. For example, in the direction perpendicular to the rolling direction, the arrangement order may be as follows: the first row R1 (i.e., the row in which the first sub-yoke parts 912 are arranged), the third row R3 (i.e., the row in which the second sub-yoke parts 914 are arranged), the second row R2 (i.e., the row in which the first tooth parts are arranged), and the fourth row R4 (i.e., the row in which the second tooth parts are arranged). The arrangement order of the rows may be flexibly selected by those of ordinary skill in the art according to manufacturing requirements, which is also included in the protection scope of the present application. After the silicon steel sheet 910 of FIG. 9 is stamped, one first sub-yoke part 912 corresponds to one first tooth part 916 and one second sub-yoke part 914 corresponds to one second tooth part 918, which can be used to manufacture the stator of FIG. 5A to FIG. 5F.

Figure 10:
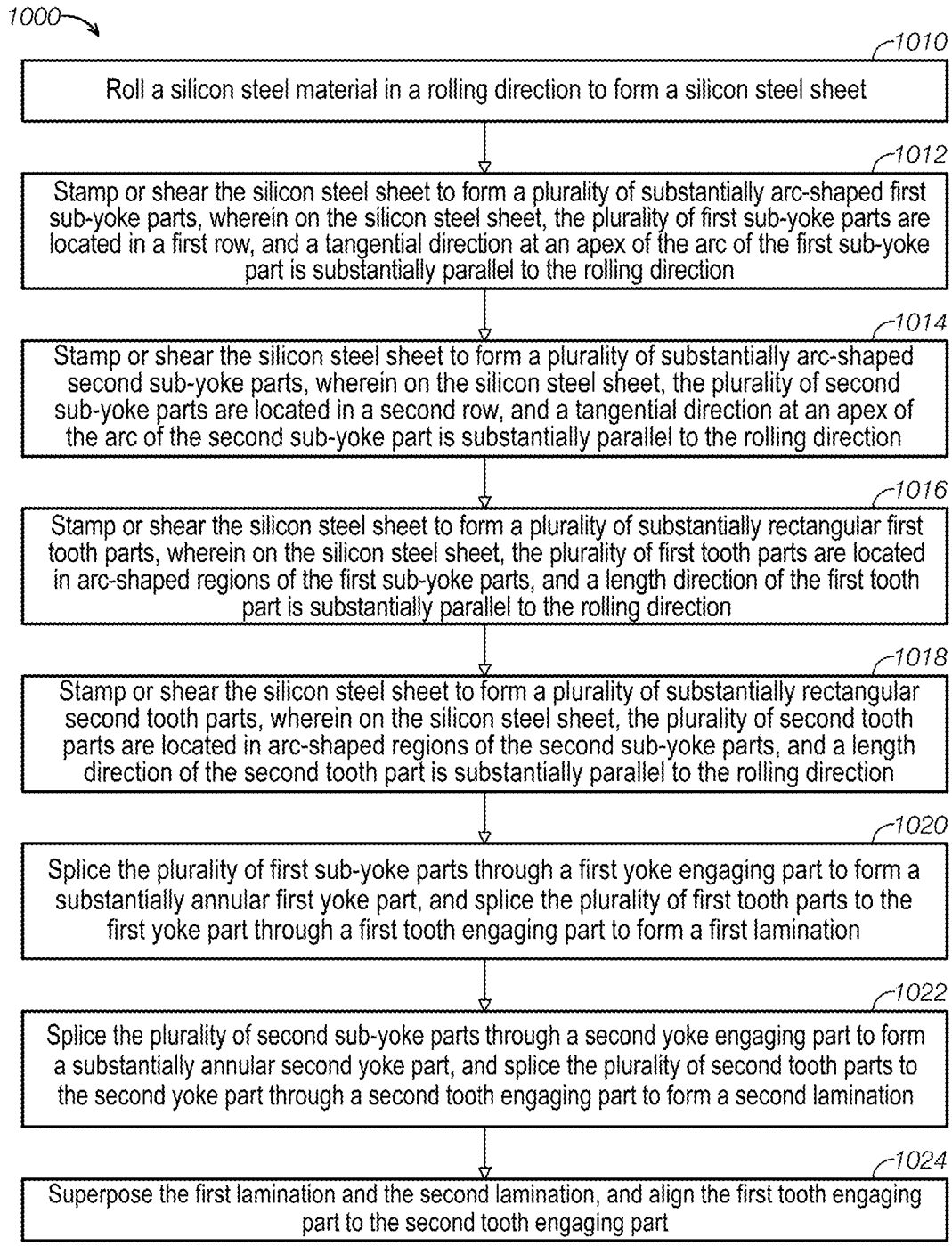
FIG. 10 is a flowchart of a method of manufacturing a motor stator according to another embodiment of the present application.

FIG. 10 is a flowchart of a method 1000 of manufacturing a motor stator according to an embodiment of the present application. In 1010, a silicon steel material is rolled in a rolling direction to form a silicon steel sheet. In 1012, the silicon steel sheet is stamped or sheared to form a plurality of substantially arc-shaped first sub-yoke parts. On the silicon steel sheet, the plurality of first sub-yoke parts is located in a first row, and a tangential direction at an apex of an arc of the first sub-yoke part is substantially parallel to the rolling direction. The first sub-yoke part includes a first yoke engaging part located on a side edge thereof and a first yoke opening located on an inner edge thereof. The first yoke opening is a part of the first tooth engaging part. In some embodiments, the first yoke engaging part has the structure as shown in FIG. 1 to FIG. 5B. The first tooth engaging part includes the first yoke opening. The first yoke opening has the structure as shown in FIG. 2A and FIG. 2B. In other embodiments, the first yoke opening has the structure as shown in FIG. 5A and FIG. 5B.

As represented by 1014, the silicon steel sheet is stamped or sheared to form a plurality of substantially arc-shaped second sub-yoke parts. On the silicon steel sheet, the plurality of second sub-yoke parts are located in a second row, and a tangential direction at an apex of an arc of the second sub-yoke part is substantially parallel to the rolling direction. The second sub-yoke part includes a second yoke engaging part located on a side edge thereof and a second yoke protrusion located on an inner edge thereof. The second yoke protrusion is a part of a second tooth engaging part. In some embodiments, the second yoke engaging part has the structure as shown in FIG. 1 to FIG. 5B. In some embodiments, the second yoke protrusion has the structure as shown in FIG. 3A to FIG. 3B. In other embodiments, the first yoke opening has the structure as shown in FIG. 5C and FIG. 5D.

The silicon steel sheet is stamped or sheared to form a plurality of substantially rectangular first tooth parts as illustrated at 1016. On the silicon steel sheet, the plurality of first tooth parts are located in arc-shaped regions of the first sub-yoke parts, and a lengthwise direction of the first tooth part is substantially parallel to the rolling direction. The first tooth part includes a first tooth protrusion located at an end part thereof. The first tooth protrusion is a part of the first tooth engaging part and constitutes the first tooth engaging part together with the first yoke opening. In some embodiments, the first tooth protrusion has the structure as shown in FIG. 2B. In other embodiments, the first tooth protrusion has the structure as shown in FIG. 5A and FIG. 5B.

At 1018, the silicon steel sheet is stamped or sheared to form a plurality of substantially rectangular second tooth parts. On the silicon steel sheet, the plurality of second tooth parts are located in arc-shaped regions of the second sub-yoke parts, and a lengthwise direction of the second tooth part is substantially parallel to the rolling direction. The second tooth part includes a second tooth opening located at an end part thereof. The second tooth opening is a part of the second tooth engaging part and constitutes the second tooth engaging part together with the second yoke opening. In some embodiments, the second tooth opening has the structure as shown in FIG. 2B. In other embodiments, the second tooth opening and the first tooth opening together constitute the first tooth engaging part. The second tooth opening has the structure as shown in FIG. 5C and FIG. 5D.

The plurality of first sub-yoke parts is spliced through the first yoke engaging part to form a substantially annular first yoke part, and the plurality of first tooth parts are spliced to the first yoke part through the first tooth engaging part to form a first lamination as illustrated at 1020. In 1022, the plurality of second sub-yoke parts are spliced through the second yoke engaging part to form a substantially annular second yoke part, and the plurality of second tooth parts are spliced to the second yoke part through the second tooth engaging part to form a second lamination. In 1024, the first lamination and the second lamination are superposed, and the first tooth engaging part is made to align to the second tooth engaging part.

Figure 11:
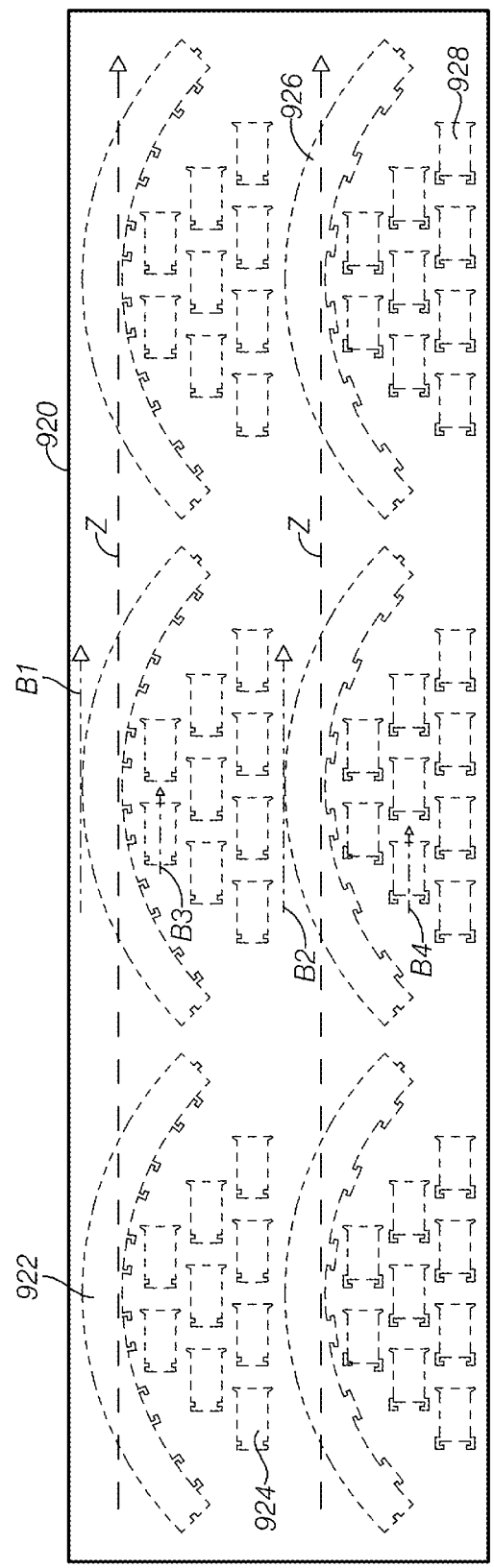
FIG. 11 shows arrangement of sub-yoke parts and tooth parts on a silicon steel sheet before the stamping from the method of FIG. 10.

FIG. 11 shows a silicon steel sheet 920 before stamping in the method 1000 according to the present application; dashed lines indicate positions of sub-yoke parts and tooth parts on the silicon steel sheet 920 before stamping. A tangential direction B1 at an apex of an arc of a first sub-yoke part 922, a tangential direction B2 at an apex of an arc of a second sub-yoke part 926, a lengthwise direction B3 of a first tooth part 924, and a lengthwise direction B4 of a second tooth part 928 are all parallel to a rolling direction Z. As illustrated in FIG. 10, a plurality of first sub-yoke parts 922 and a plurality of second sub-yoke parts 926 may be separately rolled in a row in the lengthwise direction parallel to the rolling direction Z. A plurality of first tooth parts 924 and a plurality of second tooth parts 928 may be located in arc-shaped regions of the first sub-yoke parts 922 or the second sub-yoke parts 924, so that the regions under the arcs of the sub-yoke parts can be effectively utilized, and the material utilization of the silicon steel sheet can reach at least 70%.

It should be understood that the method of the present application also includes other arrangement configurations, e.g., alternately arranging two or more of the first sub-yoke part 922, the second sub-yoke part 926, the first tooth part 924, and the second tooth part 928 in a row in the rolling direction can be flexibly selected by those of ordinary skill in the art according to manufacturing requirements, and is also included in the protection scope of the present application. After the silicon steel sheet 920 of FIG. 9B is stamped, one first sub-yoke part 922 corresponds to a plurality of first tooth parts 924, and one second sub-yoke part 926 corresponds to a plurality of second tooth parts 928, which can be used to manufacture the stator of FIG. 6A and FIG. 6B.

It should be understood that in the methods of manufacturing the motor stator described in FIG. 7 and FIG. 10, the four elements of the first sub-yoke part, the first tooth part, the second sub-yoke part, and the second tooth part can be formed in one stamping or shearing step. Or, the first sub-yoke part, the first tooth part, the second sub-yoke part, and the second tooth part can be respectively formed in four separate stamping or shearing steps.

As described in the previous embodiments, the first sub-yoke part may include a first yoke opening located on an inner edge thereof, the first tooth part includes a first tooth protrusion located at an end part thereof; and the second sub-yoke part includes a second yoke protrusion located on an inner edge thereof, and the second tooth part includes a second tooth opening at an end part thereof. When the first lamination and the second lamination are superposed in the axial direction, the first tooth protrusion of the first lamination is aligned to the second yoke protrusion of the second lamination in the axial direction. This way, engagement contours of the first tooth engaging part and the second tooth engaging part in the circumferential direction are not aligned, that is, are at least partially staggered. As such the following problem can be avoided: the entire tooth part detaching in the circumferential direction due to the alignment of the engagement contours; and the splicing stability of the stator is improved.

According to the stator of the representative embodiments of the present application, the tooth parts and the yoke parts are spliced through the engaging parts; both the tooth parts and the yoke parts are formed by stamping or shearing a non-oriented silicon steel sheet in the rolling direction. The majority of the electromagnetic working region of the final stator is in the rolling direction, among which 100% of the electromagnetic working region of the tooth part is in the rolling direction, and 60-80% of the electromagnetic working region of the yoke part is in the rolling direction. Iron loss is thus reduced, and magnetic performance is enhanced.

It should be understood that the structures and the procedures disclosed in the description of the present application are representative. The specific embodiments should not be construed as limiting because a plurality of variations may exist.

The above description only describes representative embodiments of the claimed subject matter, and is not intended to limit the claimed subject matter. Various modifications and changes can be made by those skilled in the art. Any modification, equivalent replacement, improvement, and the like made within the spirit and principle of the present disclosure shall be included within the protection scope of the claimed subject matter.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A stator for a motor, comprising:
    a first lamination comprising a plurality of first sub-yoke parts and a plurality of first tooth parts, the plurality of first sub-yoke parts being spliced through a first yoke engaging part to form an annular first yoke part, and the plurality of first tooth parts being assembled on an inner edge of the first yoke part through a first tooth engaging part; and
    a second lamination arranged adjacent to the first lamination in an axial direction, the second lamination comprising a plurality of second sub-yoke parts and a plurality of second tooth parts, the plurality of second sub-yoke parts being spliced through a second yoke engaging part to form an annular second yoke part, and the plurality of second tooth parts being assembled on an inner edge of the second yoke part through a second tooth engaging part,
    wherein the first tooth engaging part and the second tooth engaging part are superposed in the axial direction, wherein the first sub-yoke part comprises two first notches recessed from an inner edge thereof, the first tooth part comprises two first lugs protruding from an end part thereof, the two first notches and the two first lugs constitute the first tooth engaging part, and the two first lugs of the first tooth part are respectively received in the two first notches of the first sub-yoke part, and wherein the second sub-yoke part comprises two second lugs protruding from an inner edge thereof, the second tooth part comprises two second notches recessed from an end part thereof, the two second lugs of the second sub-yoke part and the two second notches of the second tooth part constitute the second tooth engaging part, and the two second lugs of the second sub-yoke part are respectively received in the two second notches of the second tooth part.

2. The stator according to claim 1, wherein the first sub-yoke part and the second sub-yoke part are formed by stamping a single silicon steel sheet and are arc-shaped, a first tangential direction at an apex of the arc of the first sub-yoke part is consistent with a rolling direction of the silicon steel sheet, and a second tangential direction at an apex of the arc of the second sub-yoke part is consistent with the rolling direction of the silicon steel sheet.

3. The stator according to claim 2, wherein the first tooth part has a first lengthwise direction parallel to a radial direction of the stator, the second tooth part has a second lengthwise direction parallel to the radial direction of the stator, the first tooth part and the second tooth part are formed by stamping the single silicon steel sheet, and a first lengthwise direction of the first tooth part and a second lengthwise direction of the second tooth part are consistent with the rolling direction of the silicon steel sheet.

4. The stator according to claim 1, wherein:
    the first tooth part has a first lengthwise direction parallel to a radial direction of the stator;
    the second tooth part has a second lengthwise direction parallel to the radial direction of the stator;
    the first sub-yoke part and the second sub-yoke part are arc-shaped;
    the first tooth part, the second tooth part, the first sub-yoke part, and the second sub-yoke part are formed by stamping of a single silicon steel sheet; and
    a first tangential direction at an apex of the arc of the first sub-yoke part and a second tangential direction at an apex of the arc of the second sub-yoke part are both consistent with the rolling direction of the silicon steel sheet, and the first lengthwise direction of the first tooth part and the second lengthwise direction of the second tooth part are both consistent with a rolling direction of the silicon steel sheet.

5. The stator according to claim 1, wherein:
    a quantity of the first sub-yoke parts equals a quantity of the first tooth parts, one first tooth part being spliced to an inner edge of one first sub-yoke part; and
    a quantity of the second sub-yoke parts equals a quantity of the second tooth parts, one second tooth part being spliced to an inner edge of one second sub-yoke part.

6. The stator according to claim 1, wherein a quantity of the first sub-yoke parts is less than a quantity of the first tooth parts, a plurality of first tooth parts being spliced to an inner edge of one first sub-yoke part; and a quantity of the second sub-yoke parts is less than a quantity of the second tooth parts, a plurality of second tooth parts being spliced to an inner edge of one second sub-yoke part.

7. The stator according to claim 1, wherein the stator comprises a plurality of first laminations and a plurality of second laminations, and the first laminations and the second laminations are arranged alternately in the axial direction.

8. A stator for a motor, comprising:
a first lamination comprising a plurality of first sub-yoke parts and a plurality of first tooth parts, the plurality of first sub-yoke parts being spliced through a first yoke engaging part to form an annular first yoke part, and the plurality of first tooth parts being assembled on an inner edge of the first yoke part through a first tooth engaging part; and
a second lamination arranged adjacent to the first lamination in an axial direction, the second lamination comprising a plurality of second sub-yoke parts and a plurality of second tooth parts, the plurality of second sub-yoke parts being spliced through a second yoke engaging part to form an annular second yoke part, and the plurality of second tooth parts being assembled on an inner edge of the second yoke part through a second tooth engaging part,
wherein the first tooth engaging part and the second tooth engaging part are superposed in the axial direction, wherein the first sub-yoke part defines a first opening located on an inner edge thereof, the first tooth part comprises a first protrusion located at an end part thereof, the first opening and the first protrusion constitute the first tooth engaging part, and the first protrusion is received in the first opening,
wherein the first opening is defined by two L-shaped first legs that extend radially from the inner edge of the first sub-yoke part and are spaced apart, the two first legs having first protruding parts that extend toward each other, and the two first legs being mirror-symmetrical to form a first groove, wherein the first protrusion of the first tooth part is located at the end part of the first tooth part facing the first sub-yoke part, and comprises two first grooves respectively located on two side edges of the first tooth part in a lengthwise direction and first tooth protruding parts located above the first grooves, the first tooth protruding parts being received in the first opening of the first sub-yoke part, and the first protruding parts of the first sub-yoke part being received in the first grooves, and
wherein the second tooth part defines a second opening located at an end part thereof, the second sub-yoke part comprises a second protrusion located on an inner edge thereof, the second protrusion of the second sub-yoke part and the second opening of the second tooth part constitute the second tooth engaging part, and the second protrusion is received in the second opening.

9. The stator according to claim 8, wherein:
the second opening of the second tooth part is defined by two C-shaped second legs that extend radially from the end part of the second tooth part and are spaced apart, the second legs each having a second protruding part, and the two first legs being mirror-symmetrical to form a second groove; and
the second protrusion of the second sub-yoke part comprising two second sub-yoke protruding parts, the two second sub-yoke protruding parts being spaced apart from the inner edge of the second sub-yoke part to form two second grooves, the second sub-yoke protruding parts being receivable in the second opening of the second tooth part, and the second protruding parts of the second tooth part being receivable in the second grooves of the second sub-yoke part.

10. A stator for a motor, comprising:
a first lamination, the first lamination comprising a plurality of first sub-yoke parts and a plurality of first tooth parts, the plurality of first sub-yoke parts being spliced through a first yoke engaging part to form an annular first yoke part, wherein the first sub-yoke part defines a first yoke opening located on an inner edge thereof, the first tooth part comprises a first tooth protrusion located at an end part thereof, and the first tooth protrusion is received in the first yoke opening; and
a second lamination arranged adjacent to the first lamination in an axial direction, the second lamination comprising a plurality of second sub-yoke parts and a plurality of second tooth parts, the plurality of second sub-yoke parts being spliced through a second yoke engaging part to form an annular second yoke part, wherein the second sub-yoke part comprises a second yoke protrusion located on an inner edge thereof, the second tooth part defines a second tooth opening located at an end part thereof, and the second yoke protrusion is received in the second tooth opening, wherein the first tooth protrusion and the second sub-yoke protrusion are at least partially overlapped in the axial direction.

11. The stator according to claim 10, wherein the first yoke opening and the first tooth protrusion are configured to be interference-fitted, and the second yoke protrusion and the second tooth opening are configured to be interference-fitted.

12. The stator according to claim 10, wherein the first sub-yoke opening is defined by two first legs that extend radially from the inner edge of the first sub-yoke part and are spaced apart, the first legs each having an L-shaped first protruding part extending toward the first tooth part, the two first legs being mirror-symmetrical and forming a first groove together with a part of the inner edge of the first sub-yoke part, two side surfaces of the first tooth part each having a recess to form the first tooth protrusion, and the first tooth protrusion being received in the first groove of the first sub-yoke part, and wherein the second tooth opening is defined by two second legs that extend radially from the end part of the second tooth part and are spaced apart, the second legs extending from the end part of the second tooth part toward a second side surface and are C-shaped, the two second legs being mirror-symmetrical to form a second groove together with the end part of the tooth part, and the second yoke protrusion being received in the second groove of the second tooth part.

13. The stator according to claim 10, wherein the first yoke opening is defined by two first notches recessed from the inner edge of the first sub-yoke part, the first tooth protrusion comprises two first lugs protruding from the end part, and the two first lugs of the first tooth part are respectively received in the two first notches of the first sub-yoke part; and the second yoke protrusion comprises two second lugs located and protruding from the inner edge of the second sub-yoke part, the second tooth opening comprises two second notches recessed from the end part, and the two second lugs of the second sub-yoke parts are received in the two second notches of the second tooth part.

* * * * *